United States Patent [19]

Seidel et al.

[11] 4,206,352

[45] Jun. 3, 1980

[54] HEATER DESIGN FOR READING RADIATION DOSIMETERS

[75] Inventors: John G. Seidel, McCandless; Patrick E. Felice, Lincoln Heights, both of Pa.

[73] Assignee: Westinghouse Electric Corp., Pittsburgh, Pa.

[21] Appl. No.: 928,641

[22] Filed: Jul. 27, 1978

[51] Int. Cl.² .............................................. G01T 1/11
[52] U.S. Cl. ...................................................... 250/337
[58] Field of Search ................................. 250/337, 484

[56] References Cited

U.S. PATENT DOCUMENTS

| 3,300,643 | 1/1967 | McCall | 250/337 |
| 3,471,699 | 10/1969 | McCall | 250/484 |
| 3,809,901 | 5/1974 | Szalanczy et al. | 250/337 |
| 3,883,748 | 5/1975 | Nada et al. | 250/484 |
| 4,053,772 | 10/1977 | Felice | 250/337 |

Primary Examiner—Davis L. Willis
Attorney, Agent, or Firm—M. P. Lynch

[57] ABSTRACT

The heating element in a conventional radiation dosimeter reading apparatus which functions to both physically support a dosimeter as well as heat the dosimeter to a temperature of luminescence, is modified to include a dished portion, or recessed portion, having a flat bottom and sufficient dimensions to receive the radiation dosimeter and allow for the positioning of a transparent retainer, i.e., a glass plate, in contact with the dosimeter to physically retain the dosimeter in the recess to avoid deformation of the dosimeter when heated, and transmit light emanating from the dosimeter when heated.

3 Claims, 4 Drawing Figures

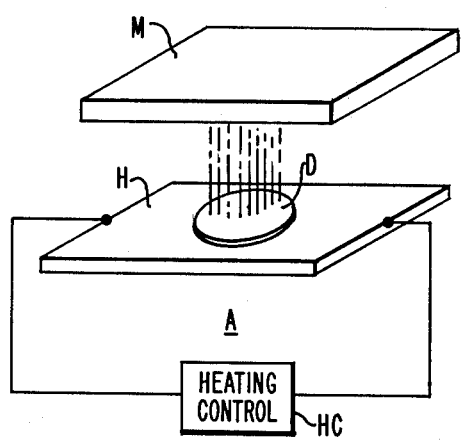
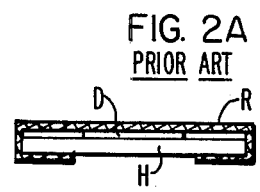
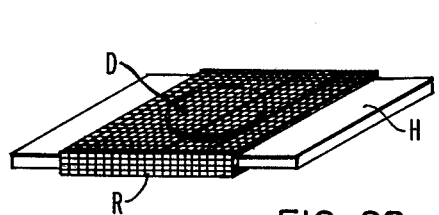
FIG. 1 PRIOR ART
FIG. 2A PRIOR ART
FIG. 2B PRIOR ART
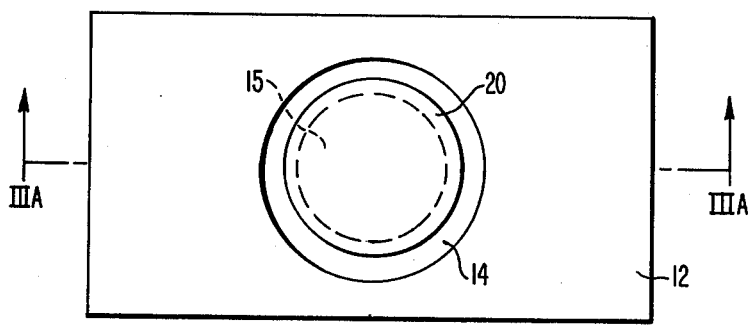
FIG. 3B
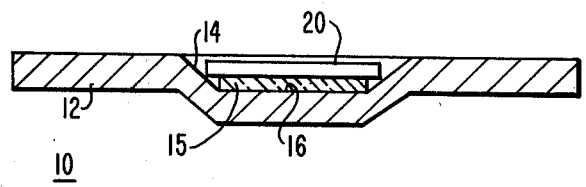
FIG. 3A

4,206,352

HEATER DESIGN FOR READING RADIATION DOSIMETERS

BACKGROUND OF THE INVENTION

Thousands of thin disc-like radiation dosimeters are employed each year to detect radon gas emanating from beneath the surface of the ground to serve as an indicator of possible uranium deposits. Due to the cost involved and the substantial quantities of dosimeters employed in mapping sections of the ground in support of uranium exploration, the capability of reusing the dosimeters represents a significant cost factor.

An analysis of the present useful life of a dosimeter indicates that handling during read-out of the dosimeter can significantly affect the useful life of the dosimeter. Two factors identified as having an adverse affect on the useful life of the dosimeter include mechanical degradation due to the conventional techniques for securing the thin wafer-like dosimeter to the heating element of a dosimeter read-out apparatus and secondly, oxide contamination of the dosimeter by the metal retaining element employed in the dosimeter reading apparatus.

SUMMARY OF THE INVENTION

The nichrome heating element of the conventional dosimeter reading apparatus is designed to include a depression having a flat bottom and of sufficient dimensions to allow for the positioning of the dosimeter disc within the recess and resting flat against the bottom of the recess. A thin glass plate suitable for transmitting visible light is positioned in the recess on top of the dosimeter to physically retain the dosimeter in the recess during the heating and reading process. The glass plate is of sufficient size to totally cover the dosimeter within the recess and of sufficient mass to prevent the dosimeter from curling or deforming during the heating process employed to read the radiation information stored in the dosimeter. Care is taken in selecting the mass of the glass plate to avoid the plate functioning as a heat sink thereby preventing a portion of the dosimeter from being read during the heating process. This technique for securing the radiation dosimeter in contact with the heating element of the reading apparatus avoids physical scratching or damage to the dosimeter encountered in conventional techniques for retaining the dosimeter in contact with the heating element.

It has been determined experimentally that this technique significantly increases the life of the dosimeter by essentially eliminating physical damage to the dosimeter during the reading process. This in turn substantially improves the reproducibility of the readings from the dosimeter and reduces the handling time required to process the dosimeter thereby increasing the rate at which dosimeters can be processed by the dosimeter reading apparatus.

DESCRIPTION OF THE DRAWINGS

The invention will become readily apparent from the following exemplary description in connection with the accompanying drawings:

FIGS. 1, 2A, and 2B are Prior Art illustrations of mechanical means conventionally employed for securing a dosimeter to the heating element of a reading apparatus; and FIGS. 3A and 3B are illustrations of the inventive technique for physically retaining the dosimeter in contact with the heating element of a dosimeter reading apparatus.

DESCRIPTION OF THE PREFERRED EMBODIMENT

A Prior Art illustration of a conventional dosimeter reading apparatus A is schematically illustrated in FIG. 1. A radiation dosimeter D, herein illustrated to be a wafer disc, is disposed in contact with a heating element H which responds to electrical excitation from heater control HC to heat the dosimeter D to a level of luminescence causing light to be emitted from the dosimeter. The level of light emitted is a function of the level of radiation to which the dosimeter has been exposed. The light released by the dosimeter in response to heating by the heating element H is measured by a light measuring device M which typically is implemented through the use of photomultiplier tubes. A typical radiation dosimeter reading apparatus is illustrated and described in U.S. Pat. No. 3,300,643, issued Jan. 24, 1967. Other commercially-available radiation dosimeter reading instruments are available from Teledyne Isotopes, Inc.

The radiation dosimeter D is typically a composition of a thermoluminescence phosphor and a binder or support material. A particularly attractive thermoluminescent phosphor is calcium sulfate:dysprosium and a particularly suitable binder or support material is Teflon. Suitable radiation dosimeter compositions and techniques for fabricating such dosimeters are described in U.S. Pat. Nos. 3,471,699 and 3,883,748. The recognition of thermoluminescent dosimeters for the storage of alpha particles as a technique for uranium exploration is described in U.S. Pat. No. 4,053,772 entitled, "Locating Underground Uranium Deposits", issued Oct. 11, 1977, assigned to the assignee of the present invention and incorporated herein by reference. The alpha sensitive properties of thermoluminescent dosimeters for use in uranium exploration are further defined in the following pending patent applications:

Item 1—Ser. No. 824,203, entitled "Locating Underground Uranium Deposits", filed Aug. 12, 1977, and assigned to the Assignee of the present invention.

Item 2—Ser. No. 874,976, entitled, "Improved Thermoluminescent Dosimeter System", filed Feb. 3, 1978, and assigned to the assignee of the present invention.

Item 3—Ser. No. 892,813, filed Apr. 3, 1978, entitled, "A Novel Technique for Fabricating Radiation Sensitive Dosimeters", and assigned to the assignee of the present invention.

Item 1 above represents a division of the above-identified issued U.S. Pat. No. 4,053,772. Item 2 discloses the use of a protective film in combination with the radiation dosimeter to provide protection against moisture, soil, etc. Item 3 discloses a technique for forming thin, uniform radiation dosimeters.

Referring to FIGS. 2A and 2B, there is illustrated a Prior Art heating element configuration used in commercially available radiation dosimeter reading apparatus. The heating element H which is typically an elongated flat plate element made of a high resistance metal such as Nichrome, functions to both support the radiation dosimeter D to be read as well as functioning as the electrical heating element. In the Prior Art illustration of FIGS. 2A and 2B, the wafer-like dosimeter D is secured in contact with the heater H by sliding the dosimeter D between the Nichrome mesh retainer R and the heater H. The mesh construction of the retainer R permits the passage of light from the dosimeter D for reading by a light measuring device as illustrated in FIG. 1.

Inasmuch as a dosimeter D can be processed for re-use, it is desirable to extend the useful life as long as possible. Recycling of the dosimeter consists of annealing the radiation dosimeter at a temperature of about 300° C. which effectively "erases" or eliminates any accumulated radiation dosage.

The potential useful life of a radiation dosimeter is significantly reduced as a result of the mechanical destruction resulting from the sliding contact of the Nichrome mesh retainer R of FIGS. 2A and 2B with the surface of the dosimeter D during the dosimeter reading process. The wafer-like dosimeters D are typically of a thickness between 1 and 3 mils thus rendering them susceptible to tearing or wrinkling when subjected to the sliding contact of the Nichrome mesh retainer R of FIGS. 2A and 2B.

A further adverse effect on the useful life of the dosimeter D resulting from the use of the Nichrome mesh retainer R is the formation of oxide contamination on the dosimeter from the retainer R. This oxide contamination is manifested as a change in the color of the dosimeter from an initial white color to a noticeably darker color after several read-outs of the dosimeter. This oxide contamination adversely affects the accuracy and reproducibility of the information derived from the radiation dosimeter by the light measuring device of FIG. 1.

The heating element configuration and dosimeter retainer element illustrated in FIGS. 3A and 3B significantly eliminates the adverse effects on the useful life of a dosimeter described above with reference to the Prior Art illustrations of FIGS. 2A and 2B. The mesh retainer R of FIGS. 2A and 2B is replaced by the combination of a depression or recess 14 in the heating element 12 which is of suitable dimensions to accommodate the positioning of the dosimeter 15 in a flat position against the flat base 16 of the recess 14, and the positioning of a glass retainer 20 on top of the dosimeter 15. The glass retainer 20, which is capable of transmitting visible light, is large enough to cover the entire dosimeter 15 and small enough to maintain total contact with the dosimeter 15 and maintain the dosimeter 15 in contact with the flat base 16 of the recess 14. The thickness of the glass retainer 20 should be sufficient to prevent the dosimeter 15 from curling or moving during the heating process, but it is important that the glass retainer 20 not be so massive that it acts as a heat sink, thereby preventing a portion of the dosimeter 15 from releasing the light energy corresponding to the stored radiation during heating.

Experimental evaluation of the heater design and retainer configuration of FIGS. 3A and 3B in comparison with the Prior Art configuration of FIGS. 2A and 2B demonstrated a dramatic decrease in the dosimeter wear due to handling in the reading process and further demonstrated a significant improvement in the reproducibility of the dosimeter readings. A further advantage realized in employing the configuration of FIGS. 3A and 3B was an increase in sensitivity realized by removing the light obstructions represented by the metal members of the mesh retainer R of FIGS. 2A and 2B and replacing it with a totally light transmitting glass retainer 20.

What is claimed is:

1. In an apparatus for measuring the light emitted from a flat thermoluminescent radiation dosimeter in response to the heating of the dosimeter to provide a readout of the level of radiation to which the dosimeter had been exposed, the combination of:
   a heating element having a recess with a flat surface suitable for receiving a flat radiation dosimeter,
   a nonporous light-transmitting, flat retainer plate for positioning within said recess to completely cover and physically maintain a flat radiation dosimeter disposed within said recess against said flat surface of said recess during the heating and readout of a flat radiation dosimeter.

2. The combination of claim 1, wherein said retainer plate is a glass plate suitable for transmitting visible light and of sufficient weight to maintain a flat radiation dosimeter in a flatly disposed position against said flat surface of the recess during the heating and readout of a flat radiation dosimeter.

3. The combination of claim 1 wherein said heating element is metal plate, said recess having side wall surfaces extending from the flat surface of the recess to the surface of the metal plate, said side wall surface providing lateral support for a dosimeter disposed within said recess.

* * * * *